(No Model.)

H. C. IVES.
TOY DETACHABLE ANIMAL AND VEHICLE.

No. 499,430. Patented June 13, 1893.

WITNESSES
H. A. Lamb
Pearl M. Reynolds

INVENTOR
Harry C. Ives
By H. M. Wooster
atty.

UNITED STATES PATENT OFFICE.

HARRY C. IVES, OF BRIDGEPORT, CONNECTICUT, ASSIGNOR TO THE IVES, BLAKESLEE & WILLIAMS COMPANY, OF SAME PLACE.

TOY DETACHABLE ANIMAL AND VEHICLE.

SPECIFICATION forming part of Letters Patent No. 499,430, dated June 13, 1893.

Application filed December 19, 1892. Serial No. 455,607. (No model.)

*To all whom it may concern:*

Be it known that I, HARRY C. IVES, a citizen of the United States, residing at Bridgeport, in the county of Fairfield and State of Connecticut, have invented certain new and useful Improvements in Toy Detachable Animals and Vehicles; and I do hereby declare the following to be a full, clear, and exact description of the invention, such as will enable others skilled in the art to which it appertains to make and use the same.

My invention has for its object to produce a toy animal and vehicle which shall be simple, inexpensive to produce, and strong, and which shall be so constructed as to permit the animal to be readily detached from the vehicle and attached in place again by a child. With these ends in view I have devised the novel toy which I will now describe referring by numbers to the accompanying drawings forming part of this specification in which—

Figure 1:
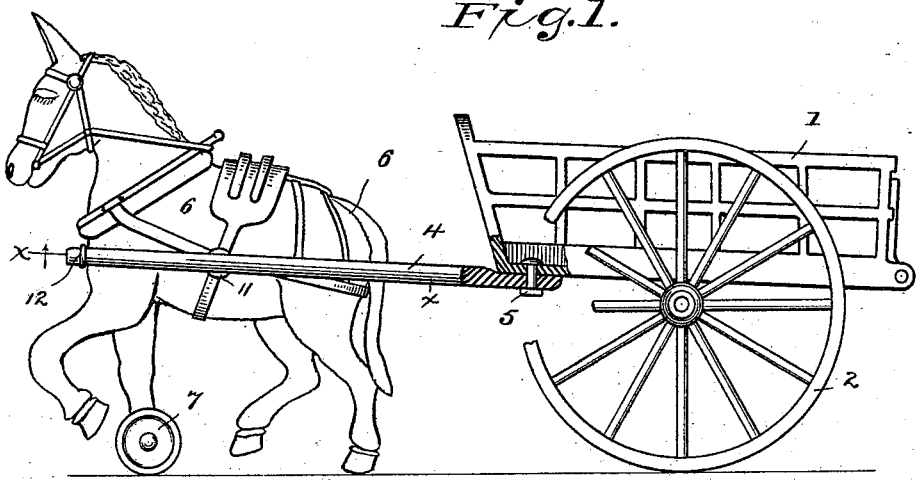
Figure 2:
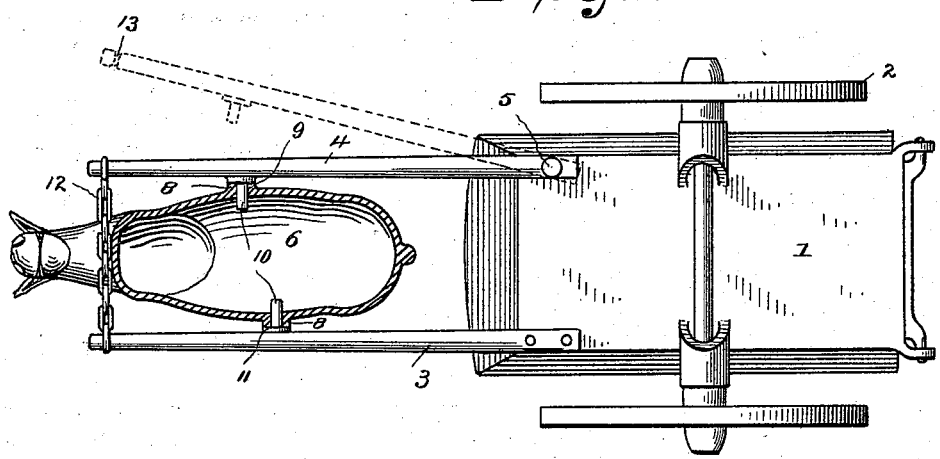

Figure 1 is a side elevation of my novel toy partially broken away to show the pivotal point of the movable shaft or thill, and Fig. 2 is an inverted plan view partly in horizontal section on the line $x\ x$ in Fig. 1.

1 denotes the vehicle body and 2 the wheels which may be of any ordinary or preferred construction, it being wholly immaterial so far as the principle of my invention is concerned what may be the shape of the body or whether two or four wheels are used.

3 denotes a fixed shaft or thill which is secured to the body in any suitable manner and 4 a pivoted shaft or thill the inner end of which is pivoted to the body as at 5 so as to permit the outer end of the shaft to be swung outward as indicated by dotted lines in Fig. 2.

6 denotes a toy animal one or more of the legs of which are preferably provided with wheels 7. The toy animal is provided on opposite sides with hubs 8 having holes 9 which are adapted to receive bosses or pins 10 on the inner sides of the shafts, hubs 11 being provided at the bases of the pins, the inner faces of which lie parallel with the inner faces of hubs 8 thereby holding the toy animal firmly in place between the shafts but allowing it to turn on the bosses or pins. The pivoted shaft is locked in place in any suitable manner, as for example by means of a chain 12 one end of which is rigidly secured to the fixed shaft the other end being adapted to slip over the end of the pivoted shaft, a notch 13 being preferably provided, see dotted lines Fig. 2, near the outer end of the pivoted shaft which receives the chain when in the engaged position. To detach the animal it is simply necessary to slip the end of the chain off from the end of the pivoted shaft and swing the shaft out as clearly shown in Fig. 2. In attaching the animal in place again the pivoted shaft simply has to be swung back until the pin thereon engages the corresponding hole in the toy animal, the hole on the opposite side having been engaged by the pin on the fixed shaft, and then the parts are locked in place by passing the chain across the front of the toy animal and slipping the link or ring at the free end over the end of the pivoted shaft.

Having thus described my invention, I claim—

1. In a toy vehicle the combination with the body, of a fixed shaft 3 and a shaft 4 pivoted to the body in the horizontal plane substantially as described.

2. The combination with a toy vehicle having a fixed shaft and a pivoted shaft both of which are provided with pins on their inner sides, of a toy animal having holes in its sides to receive said pins, and suitable means for locking the pivoted shaft in position.

3. The combination with a toy vehicle having a fixed shaft and a pivoted shaft both of which are provided with pins on their inner sides, of a toy animal having holes in its sides adapted to receive said pins, and a chain one end of which is attached to the fixed shaft and the other adapted to engage the pivoted shaft to hold the latter in engaging position.

4. The combination with a toy vehicle having a fixed shaft and a pivoted shaft both of which are provided with pins on their inner sides and hubs at the bases of the pins, of a toy animal having hubs on its sides and holes in said hubs to receive the pins on the shafts, and suitable means for retaining said parts in engaging position.

In testimony whereof I affix my signature in presence of two witnesses.

HARRY C. IVES.

Witnesses:
A. M. WOOSTER,
PEARL M. REYNOLDS.